(12) United States Patent
Kikuchi

(10) Patent No.: US 11,486,705 B2
(45) Date of Patent: Nov. 1, 2022

(54) REMOTE OPERATION SYSTEM OF SURVEYING INSTRUMENT

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 297 days.

(21) Appl. No.: 16/626,719

(22) PCT Filed: Jun. 25, 2018

(86) PCT No.: PCT/JP2018/023978
§ 371 (c)(1),
(2) Date: Dec. 26, 2019

(87) PCT Pub. No.: WO2019/009120
PCT Pub. Date: Jan. 10, 2019

(65) Prior Publication Data
US 2020/0141730 A1 May 7, 2020

(30) Foreign Application Priority Data
Jul. 7, 2017 (JP) .............................. JP2017-134132

(51) Int. Cl.
*G01C 15/00* (2006.01)
*G01C 3/08* (2006.01)
(Continued)

(52) U.S. Cl.
CPC ............ *G01C 15/008* (2013.01); *G01C 3/08* (2013.01); *G06Q 20/065* (2013.01); *G06Q 30/04* (2013.01); *H04L 67/025* (2013.01)

(58) Field of Classification Search
CPC .............................. G06Q 50/10; G06Q 20/065
See application file for complete search history.

(56) References Cited

U.S. PATENT DOCUMENTS 7,974,714 B2 * 7/2011 Hoffberg ............ H04N 21/4318
360/75
8,316,237 B1 * 11/2012 Felsher ................. H04L 9/3249
380/282
(Continued)

FOREIGN PATENT DOCUMENTS

CN 104156867 B * 1/2018 ............. G06Q 20/20
EP 2998898 A1 3/2016
(Continued)

OTHER PUBLICATIONS

International Search Report issued in corresponding PCT Application No. PCT/JP2018/023978 dated Jul. 24, 2018.

*Primary Examiner* — Daniel S Felten
(74) *Attorney, Agent, or Firm* — Calderon Safran & Cole P.C.

(57) ABSTRACT

A remote operation system of a surveying instrument includes a surveying instrument including a survey unit, a control unit, a management server capable of communicating with the surveying instrument through the communication network, a remote terminal configured to command the management server to add a function of the surveying instrument through the communication network, and a billing system connected to the communication network, wherein the remote terminal commands the management server MS to consume a quantity of virtual currency corresponding to addition of the function, the management server adds the function of the surveying instrument when the quantity of virtual currency corresponding to addition of the function is consumed based on the command from the remote terminal, and the billing system executes a billing process based on billing data corresponding to the quantity of virtual currency.

5 Claims, 8 Drawing Sheets

(51) Int. Cl.
    *G06Q 20/06*     (2012.01)
    *G06Q 30/04*     (2012.01)
    *H04L 67/025*     (2022.01)

(56) References Cited

U.S. PATENT DOCUMENTS

| | | | | |
|---|---|---|---|---|
| 8,464,077 | B2 * | 6/2013 | Ginter | G06Q 20/12 |
| | | | | 713/192 |
| 8,533,854 | B2 * | 9/2013 | Ginter | H04N 21/6334 |
| | | | | 380/231 |
| 8,750,570 | B2 * | 6/2014 | Kerschner | G06V 10/10 |
| | | | | 348/135 |
| 9,311,670 | B2 * | 4/2016 | Hoffberg | G06Q 20/0652 |
| 9,488,592 | B1 * | 11/2016 | Maresca | G01N 25/72 |
| 9,785,988 | B2 * | 10/2017 | Petri | G06Q 30/0609 |
| 10,146,414 | B2 * | 12/2018 | Heater | A63F 13/65 |
| 11,159,909 | B2 * | 10/2021 | Anderson | G01C 15/04 |
| 2016/0266068 | A1 * | 9/2016 | Boenisch | G01N 27/904 |
| 2018/0049043 | A1 * | 2/2018 | Hoffberg | G06Q 20/065 |
| 2019/0057169 | A1 * | 2/2019 | Santarone | G06T 7/001 |

FOREIGN PATENT DOCUMENTS

| | | | | |
|---|---|---|---|---|
| EP | 3651113 | A1 * | 7/2017 | G06Q 30/04 |
| JP | 2001202566 | A | 7/2001 | |
| JP | 2002-90144 | A | 3/2002 | |
| JP | 2002-163110 | A | 6/2002 | |
| JP | 2003-179699 | A | 6/2003 | |
| JP | 2003-256180 | A | 9/2003 | |
| JP | 2004-013527 | A | 1/2004 | |
| JP | 2004-220532 | A | 8/2004 | |
| JP | 2006-198287 | A | 8/2006 | |
| JP | 2007170978 | A | 7/2007 | |
| JP | 2011164789 | A | 8/2011 | |
| JP | 2012-117874 | A | 6/2012 | |
| WO | 2014/105506 | A1 | 7/2014 | |

* cited by examiner

REMOTE OPERATION SYSTEM OF SURVEYING INSTRUMENT

CROSS-REFERENCE TO RELATED APPLICATIONS

The present application is a U.S. National Phase of PCT/JP2018/023978 filed on Jun. 25, 2018 claiming priority to Japanese Patent Application No. 2017-134132 filed on Jul. 7, 2017. The disclosure of the PCT Application is hereby incorporated by reference into the present Application.

TECHNICAL FIELD

The preset invention relates to a remote operation system of a surveying instrument, and specifically, to a remote operation system of a surveying instrument using virtual currency.

A surveying instrument (total station) performs surveying by irradiating distance-measuring light onto a target placed at a measurement point, and receiving light reflected from the target. In recent years, remote management of a surveying instrument through a communication network such as the Internet is known.

For example, Patent Literature 1 discloses a remote operation system of a surveying instrument which enables grasping of a state of a surveying instrument through a communication network and management of a license term and maintenance periods.

On the other hand, in recent years, the sophistication of surveying instruments has advanced, and in addition to functions related to the above-described license management and maintenance management, various functions including functions related to applied measurement such as a resection function, a direction angle automatic measuring function, etc., and other functions, are implemented.

CITATION LIST

Patent Literature

[Patent Literature 1] Japanese Published Unexamined Patent Application Publication No. 2007-170978

SUMMARY OF THE INVENTION

Technical Problem

A surveying instrument in which various functions are implemented provides a high degree of user convenience, and on the other hand, the surveying instrument has a problem in which it tends to become expensive, and depending on the purpose of use, a user often must purchase a surveying instrument with a function unnecessary for the user.

Under such circumstances, the inventor considered management and operation of various functions through a communication network by using a remote operation system as described in Patent Literature 1. However, settings management and operation of functions implemented in a surveying instrument main body just by using the remote operation system results in a further increase in the cost of the surveying instrument itself.

Therefore, the inventors considered that a surveying instrument that a user truly required could be provided at a reasonable price by configuring specifications capable of customizing functions by implementing functions later and enabling payment of an additional cost by a simple and safe method, and proposed the present invention.

Therefore, an object of the present invention is to provide a surveying instrument capable of customizing functions according to the needs of a user at a reasonable price.

Solution to Problem

In order to solve the above-described problem, a remote operation system of a surveying instrument according to an aspect of the present invention includes: a surveying instrument including a survey unit configured to survey a target, a control unit configured to control the survey unit, and a communication unit connected to a communication network; a management server capable of communicating with the surveying instrument through the communication network; a remote terminal configured to command the management server to add a function related to the surveying instrument through the communication network; and a billing system connected to the communication network, wherein the remote terminal is configured to command the management server to consume a quantity of virtual currency corresponding to addition of the function related to the surveying instrument, the management server is configured to add the function related to the surveying instrument when the quantity of virtual currency corresponding to addition of the function related to the surveying instrument is consumed based on the command from the remote terminal, and the billing system is configured to execute a billing process based on billing data corresponding to the quantity of virtual currency.

In the aspect described above, it is also preferable that the function related to the surveying instrument is executed by the surveying instrument.

In the aspect described above, it is also preferable that the function related to the surveying instrument is added by being downloaded to the surveying instrument from the management server.

In the aspect described above, it is also preferable that the function related to the surveying instrument is executed on a webpage displayed on the remote terminal.

It is also preferable that the function related to the surveying instrument is executed by the management server.

In the description, "adding a function" includes not only making a certain function executable by installing an implementable application or module (hereinafter, referred to as "application, etc."), but also making executable (enabling) a function that has already been implemented but is not executable by removing restrictions, etc., version upgrading of a function that has already been implemented, extending a function that has already been implemented, and when there are restrictions on a numerical quantity such as the number of executions and a range of a function that has already been implemented, removing the restrictions.

Effect of Invention

According to the remote operation system of the present invention, a surveying instrument capable of customizing functions according to the needs of a user can be provided at a reasonable price.

DESCRIPTION OF EMBODIMENTS

Hereinafter, a preferred embodiment of the present invention will be described with reference to the drawings.

Embodiment (Entire Configuration of Remote Operation System)

Figure 1:
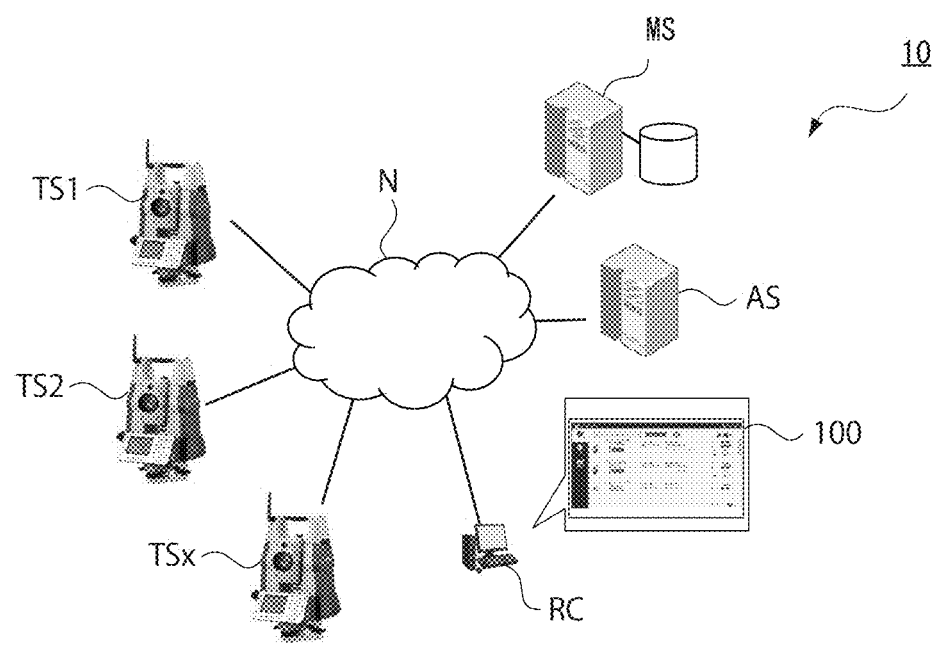
FIG. 1 is a view illustrating an entire configuration of a remote operation system according to an embodiment of the present invention.

FIG. 1 is a view illustrating an entire configuration of a remote operation system 10 according to a first embodiment of the present invention. As illustrated in FIG. 1, the remote operation system 10 includes a plurality of surveying instruments TS1, TS2 . . . TSx (hereinafter, TS is used as a representative sign) as management targets, a management server MS, a remote terminal RC, and a billing system AS. The surveying instruments TS, the management server MS, the remote terminal RC, and the billing system AS are respectively connected to a communication network N. In the description, "user" includes not only a user of the surveying instrument but also an owner of the surveying instrument or an administrator such as a management company or agent.

The communication network N may include an arbitrary communication network including the Internet, a local area network such as an internal LAN, a connection cable, and a satellite communication network, etc.

(Configuration of Surveying Instrument)

Figure 2:
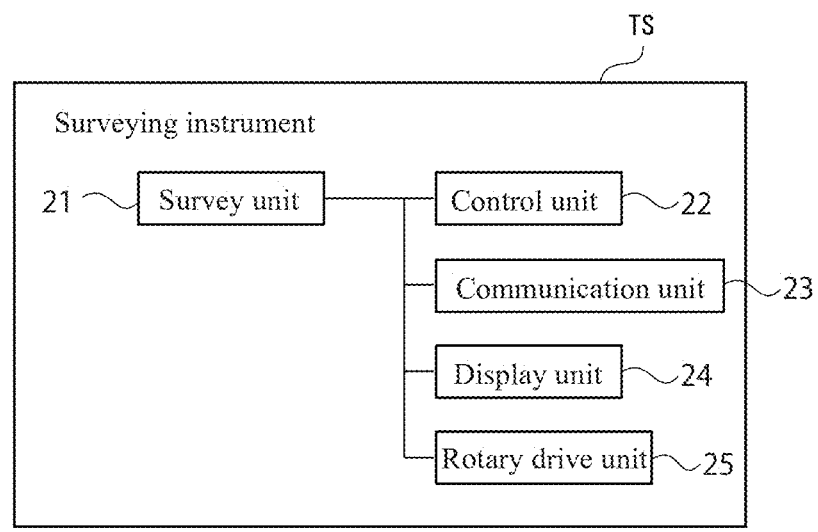
FIG. 2 is a configuration block diagram of a surveying instrument according to the same embodiment.

FIG. 2 is a configuration block diagram of a surveying instrument TS according to the embodiment. The surveying instrument TS is a total station (electronic distance and angle measuring instrument). As illustrated in FIG. 2, the surveying instrument TS includes a survey unit 21, a control unit 22, a communication unit 23, a display unit 24, and a rotary drive unit 25. The surveying instrument may be configured so that the communication unit 23 is retrofitted (externally fitted) to the surveying instrument TS.

The survey unit 21 includes a light emitting element, a distance-measuring optical system, and a light receiving element, disposed inside a telescope (not illustrated) of the surveying instrument TS. The survey unit 21 makes a distance measurement by irradiating a target with distance-measuring light emitted from the light emitting element via the distance-measuring optical system, and receiving reflected light from the target by the light receiving element. In addition, the survey unit 21 makes an angle measurement by measuring a vertical rotation angle of the telescope and a horizontal rotation angle of a housing (not illustrated) of the telescope by rotary encoders.

The communication unit 23 enables communication with the outside through the communication network N, and is connected to, for example, the Internet by using an Internet protocol (TCP/IP).

The display unit 24 has a liquid crystal screen, and survey conditions, etc., can be input therein, and various information on a survey is displayed on the display unit. The rotary drive unit 25 is a motor, including a motor to vertically rotate the telescope and a motor to horizontally rotate the housing.

The control unit 22 is a control unit including at least a CPU and a memory (ROM, RAM, etc.). The control unit 22 executes a survey application program and makes the display unit 24 display a screen according to the application. The control unit 22 drives the survey unit 21 and the rotary drive unit 25, performs automatic collimation and measures a distance and an angle to a target, and acquires survey data of a measurement point.

The control unit 22 transmits and receives information to and from the management server MS through the communication network N by using the communication unit 23. The control unit 22 transmits information on, for example, operating times, operating positions, maintenance records, and errors, etc., to the management server MS periodically or as necessary. The control unit 22 executes commands from the management server MS.

Further, the control unit 22 confirms a state with the management server MS at a constant cycle, for example, once a day such as each time of turning-on of a power supply. That is, the control unit 22 checks with the management server MS whether there is a function that should be executed and whether there is a message that should be displayed by the surveying instrument TS, etc.

Based on settings stored in the management server MS, the control unit 22 automatically downloads a module necessary for execution of a designated function and executes this function, and downloads a message stored in the management server MS and displays the message on the display unit 24.

(Configuration of Remote Terminal)

Figure 3:
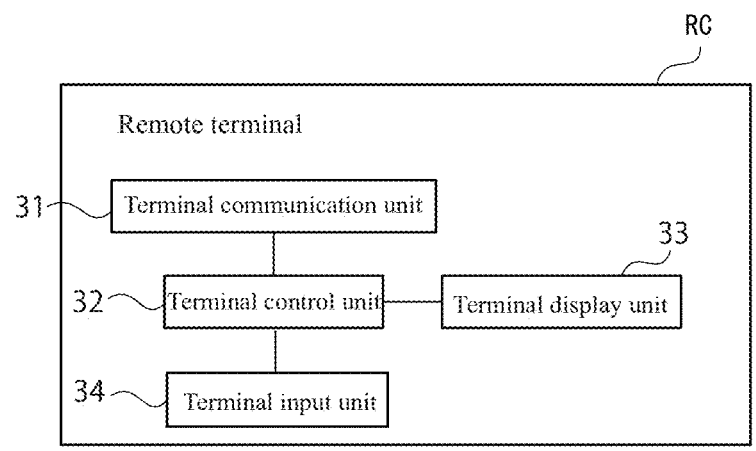
FIG. 3 is a configuration block diagram of a remote terminal according to the same embodiment.

FIG. 3 is a configuration block diagram of the remote terminal RC according to the present embodiment. The remote terminal RC is a terminal, for example, a personal computer, a smartphone, a tablet, etc., owned by a user. The remote terminal RC includes at least a terminal communication unit 31, a terminal control unit 32, a terminal display unit 33, and a terminal input unit 34 as illustrated in FIG. 3.

The terminal communication unit 31 can transmit and receive information to and from a server communication unit 41 of the management server MS described below through the communication network N.

The terminal control unit 32 is a control unit including at least a CPU and a memory (ROM, RAM, etc.). The terminal control unit 32 selects a function to be used and sets a period during which this function is usable (hereinafter, referred to as a "valid period") with respect to the surveying instrument TS as a setting target.

Based on a command from the terminal control unit 32, the terminal display unit 33 displays an operation screen for a user, including a dedicated webpage 100 for the remote operation system provided by a surveying instrument manufacturer (hereinafter, simply referred to as "manufacturer"). The terminal display unit 33 is, for example, a liquid crystal display, etc.

The terminal input unit 34 is an input device, for example, a keyboard, a numeric keypad, or a touch panel, etc., and inputs information necessary for operation of the remote terminal RC.

(Configuration of Management Server)

Figure 4:
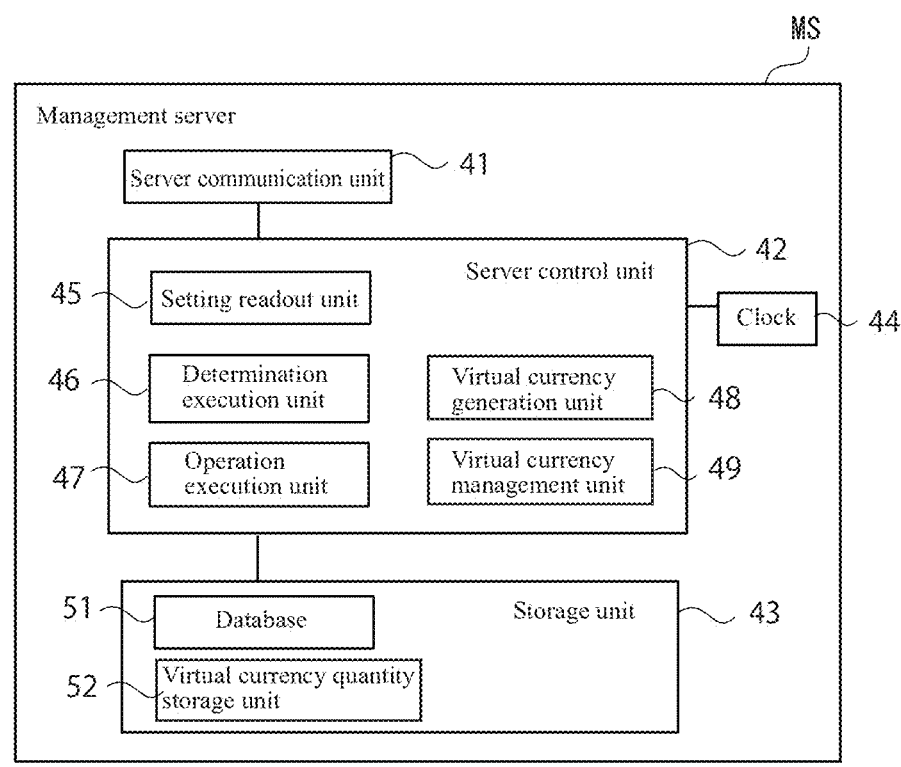
FIG. 4 is a configuration block diagram of a management server according to the same embodiment.

FIG. 4 is a configuration block diagram of the management server MS according to the present embodiment. The management server MS includes at least a server communication unit 41, a server control unit 42, a storage unit 43, and a clock 44.

The server communication unit 41 can transmit and receive information to and from the communication unit 23 of the surveying instrument TS and the terminal communication unit 31 of the remote terminal RC through the communication network N.

The storage unit 43 includes at least a database 51 and a virtual currency quantity storage unit 52. The storage unit 43 stores settings of functions related to the surveying instrument TS.

The database 51 stores information received from the surveying instrument TS and the remote terminal RC in association with a management number of the surveying instrument TS. The database 51 stores a message to be displayed on the surveying instrument TS and a message of an e-mail to be transmitted by the management server MS, for example, when a valid period of a function related to the surveying instrument expires.

The virtual currency quantity storage unit 52 stores a quantity of virtual currency to be generated in a virtual currency generation unit 48 and managed by a virtual currency management unit 49 described later.

The server control unit 42 is a control unit including at least a CPU and a memory (ROM, RAM, etc.). The server control unit 42 includes, as illustrated in FIG. 4, a setting readout unit 45, a determination execution unit 46, an operation execution unit 47, a virtual currency generation unit 48, and a virtual currency management unit 49.

The setting readout unit 45 reads out settings stored in the database 51. Specifically, the setting readout unit 45 reads out settings related to a function added with respect to the target surveying instrument, and settings related to a valid period of this function.

The determination execution unit 46 compares a current date and time acquired from the clock 44 built in the management server MS with a set valid period expiration date and time, and determines whether the current date and time is past the valid period expiration date and time.

The operation execution unit 47 executes a set operation based on settings stored in the database 51. Detailed operation will be described later.

The virtual currency generation unit 48 generates virtual currency in the form of exchange of currency such as yen, dollars, etc., on request from the remote terminal RC, and prepares billing data corresponding to a quantity of virtual currency. Here, virtual currency has monetary value enabling economic activities related to services provided by the remote operation system 10, and may be converted into cash or have exchange value to be used for other services. A user can purchase this virtual currency by, for example, automatic withdrawal from a bank account, payment by credit card, or using electronic money purchased in advance and available on the Web.

The billing data is data necessary for payment, and includes, for example, a bank account number or a credit card number, and a purchased amount, etc.

The billing system AS makes payment based on billing data corresponding to the quantity of virtual currency transmitted from the management server MS. This billing system AS is realized by a computer, and is a publicly known technique, so that detailed description of this is omitted. The billing system AS may be incorporated in the management server MS.

The quantity of virtual currency purchased by a user is stored in the virtual currency quantity storage unit 52 in association with, for example, an account of the user. The virtual currency management unit 49 manages the quantity of virtual currency stored in the virtual currency quantity storage unit 52.

Example 1

Figure 5:
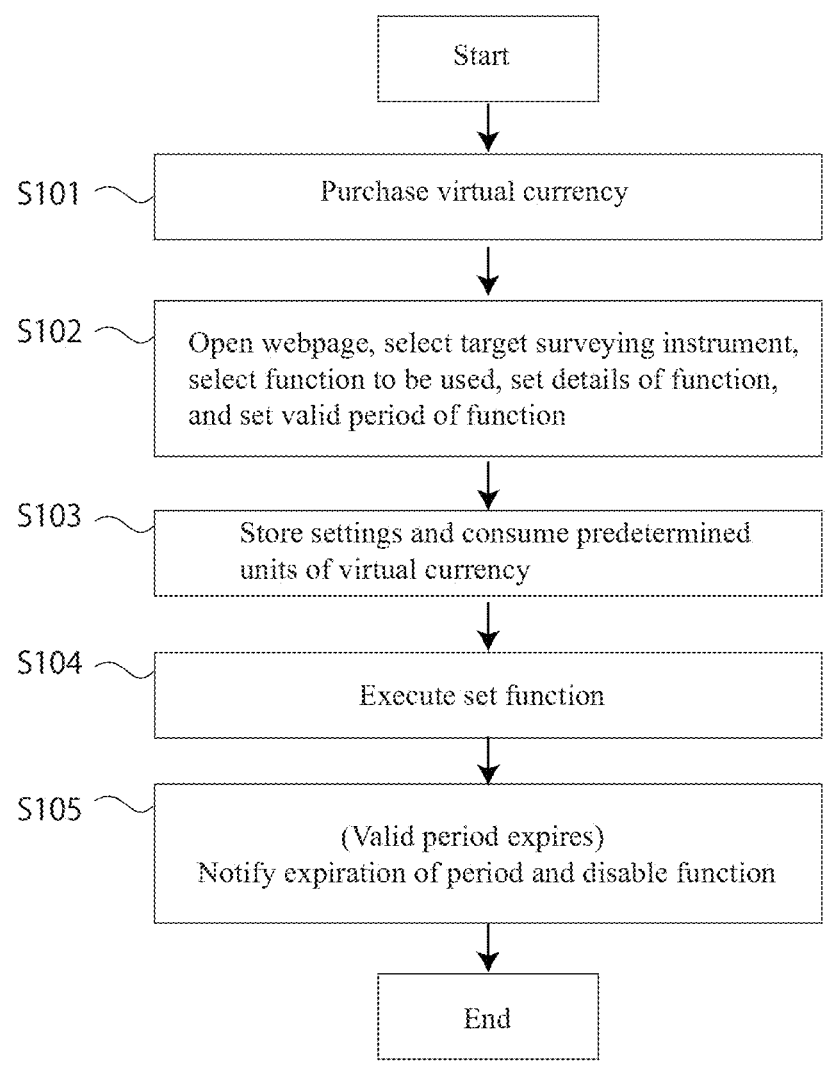
FIG. 5 is a flowchart illustrating a workflow of a remote operation system according to Example 1.

An example in which, as a function related to the surveying instrument TSx, a function to be executed by the surveying instrument TSx is added by enabling a function built in the surveying instrument TSx by using a remote operation system 10 according to the present embodiment, is illustrated. FIG. 5 is a flowchart illustrating a workflow of the remote operation system 10 according to Example 1.

In Step S101, a user logs in to the webpage 100 from the remote terminal RC, and purchases virtual currency. A quantity of the purchased virtual currency can be checked by the user on the webpage 100.

Next, in Step S102, the user logs in to the webpage 100 from the remote terminal RC, selects a target surveying instrument TSx, selects a function to be used with respect to the surveying instrument TSx, sets details of this function, and sets a valid period of this function.

The target surveying instrument TSx is selected from, for example, a list of surveying instruments TS1, TS2 . . . associated with the account of the user, displayed on the webpage 100. At this time, a plurality of surveying instruments TSx can be selected at one time.

A function related to a surveying instrument is selected from, for example, a list of selectable functions, such as check boxes and a pull-down menu, displayed on the webpage 100. Examples of selectable functions are as follows.

(1) Functions related to applied measurement, such as an opposite side measurement function, an REM measurement function, a coordinate measurement function, an area measurement function, a piling measurement function, an offset measurement function, a resection function, a direction angle automatic measurement function.

(2) Functions related to removal of restrictions on the possible number of distance measurements, the set number of usable targets, the number of measurements for a survey and the number of storable measurements.

(3) Tethering function that enables connection of an external device to the Internet by using the communication unit of the surveying instrument as a Wi-Fi router.

(4) Function related to license management such as restrictions, etc., on a time zone and a position in which the surveying instrument is usable.

In this Example, applications, etc., necessary for implementing these functions are built in the control unit of the surveying instrument at the time of shipment.

Settings of details of the functions include, for example, when there are limitations on the possible number of distance measurements, the number of target kinds, the number of measurements for a survey, etc., designation of these numbers, and when there are restrictions on ranges such as a position range, designation of ranges, and other detailed settings of functions.

Setting of a valid period of a function may include, for example, designation of a period such as "six months from a setting date" or "one year from a setting date" as a valid period of the function, and designation of a predetermined valid period expiration date and time.

On a setting completion permission screen, it is displayed that predetermined units of virtual currency need to be consumed to complete setting. By selecting "YES," the process shifts to Step S103, the settings are stored in the management server MS, and the predetermined units of virtual currency purchased in Step S101 in advance are consumed. A quantity of subtracted virtual currency is stored in the management server MS.

The quantity of virtual currency to be consumed can be arbitrarily set by the manufacturer by using, for example, the following examples singly or in combination.

(i) For the respective functions, individual unit quantities are set.

In this case, when setting a plurality of different functions at one time, a quantity of virtual currency obtained by summing the respective unit quantities is consumed.

(ii) For a combination of a plurality of functions, a unit quantity is set.

(iii) For the number of executions of a certain function, a unit quantity is set.

In this case, for example, the unit quantity of virtual currency is consumed to execute the function the predetermined number of times.

(iv) A unit quantity is set per one surveying instrument that uses a certain function.

In this case, when a function is used in a plurality of surveying instruments, a quantity of virtual currency obtained by multiplying the unit quantity by the number of surveying instruments is consumed.

(v) A unit quantity is set for a valid period (for example, one year) of a function.

In this case, for example, when a valid period of five years is set, a quantity of virtual currency five times as much as the unit quantity set for the valid period of one year is consumed.

(vi) A unit quantity is set for a company or account of a user.

In this case, for example, a set function can be applied to all of surveying instruments TS associated with the company or account.

(vii) For a function whose numerical quantity such as the number of executions is restricted, an upper limit of the numerical quantity such as the number of executions to be enabled by consuming a first unit quantity is set, and a second unit quantity is set for a numerical quantity such as the number of executions exceeding the upper limit.

In this case, it is also possible that the first unit quantity is not set, and setting is made so that executions without consuming virtual currency are allowed up to the upper limit, and only for a quantity, etc., exceeding the upper limit, virtual currency is consumed.

(viii) In a case where unit quantities are set for a function, the number of surveying instruments, and a period, etc., ranges in which use without consuming virtual currency is allowed are set, and unit quantities to be consumed in a case where upper limits of the ranges are exceeded are set for the function, the number of surveying instruments, and the period, etc., exceeding the upper limits.

Next, when the process shifts to Step S104, the surveying instrument TSx turns into a state where it can execute a set function, and the set function is executed based on settings made in Step S102.

Then, when the valid period expiration date and time arrives and the valid period expires, the process shifts to Step S105, and the management server MS disables the function and notifies the user of expiration of the valid period.

The notification is given by, for example, displaying a message on the display unit 24 of the surveying instrument TSx, displaying a message on the webpage 100, and transmitting a message by e-mail to the user.

(Operation of Management Server)

Figure 6:
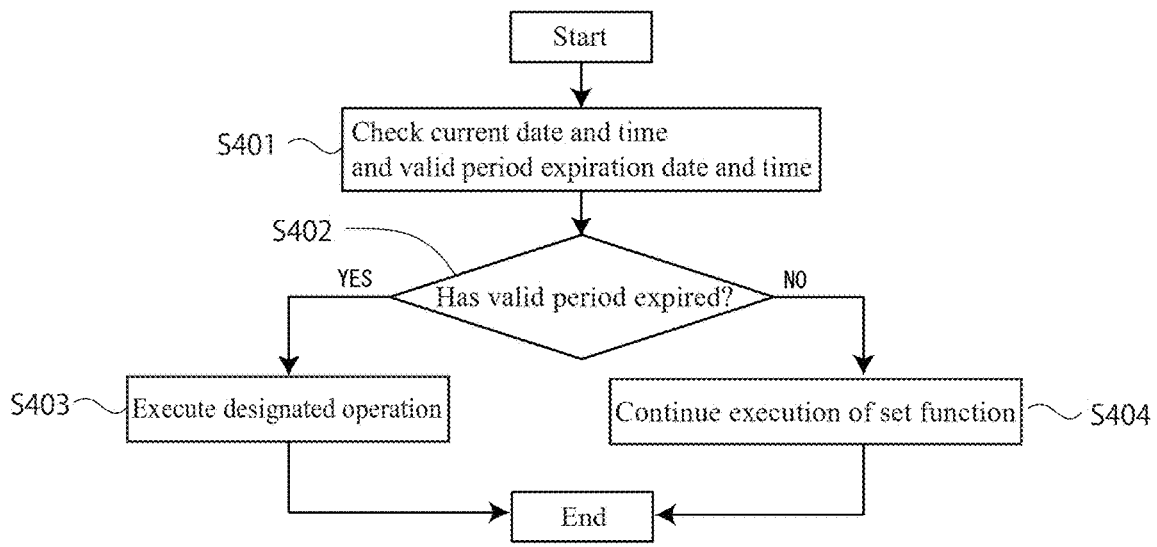
FIG. 6 is a flowchart of operation of a management server according to the same Example.

FIG. 6 is a flowchart illustrating operation of the management server MS according to the present embodiment. In a state where function addition is set, the management server MS always performs the following operation at predetermined constant intervals. First, in Step S401, the setting readout unit 45 reads out a valid period expiration date and time set for a designated function, and checks a current date and time acquired from the clock 44 and the valid period expiration date and time.

Next, when the process shifts to Step S402, the determination execution unit 46 determines whether the valid period has expired by comparing the current date and time with the valid period expiration date and time.

When the valid period expires (YES), the process shifts to Step S403, and operation designated by setting is executed. Specifically, the function in question of the surveying instrument TSx is disabled, and a notification that the valid period has expired is given to the user by displaying a message on the display unit 24 of the surveying instrument TSx, displaying a message on the webpage 100, and transmitting an e-mail to the user. Then, the management server MS ends the process.

On the other hand, when the valid period does not expire (NO), the process shifts to Step S404, and the set function is continued. Then, the management server MS ends the process.

(Operation of Surveying Instrument)

Figure 7:
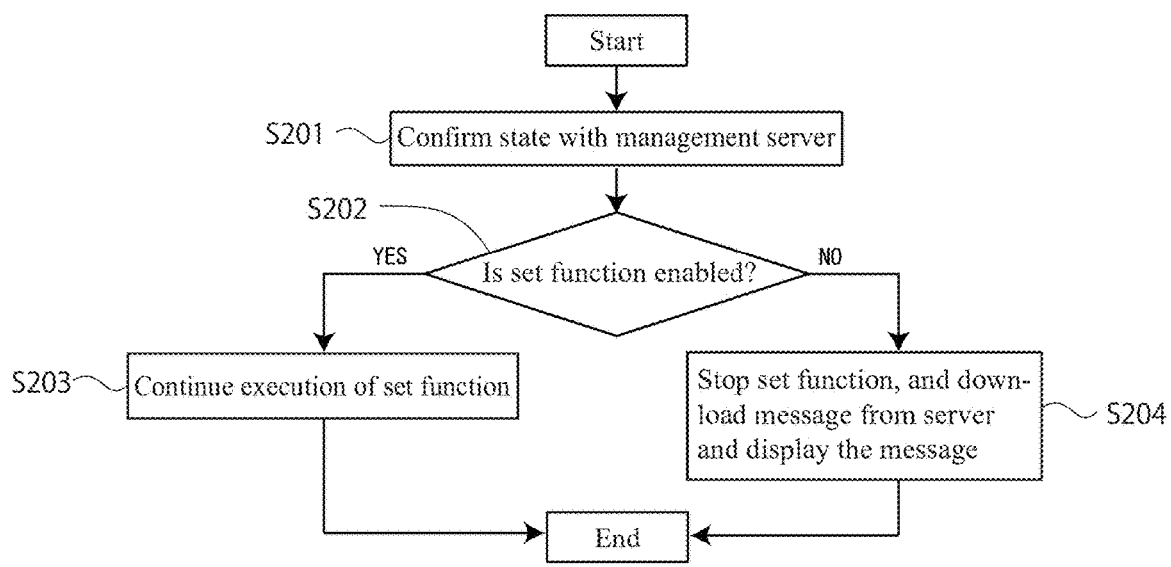
FIG. 7 is a flowchart of operation of a surveying instrument according to the same Example.

FIG. 7 is a flowchart of operation of a surveying instrument TSx according to the present Example. In a state where function addition is set, the surveying instrument TSx communicates with the management server MS at a constant cycle, and executes the following operation.

First, in Step S201, the surveying instrument TSx confirms a state with the management server MS. Next, the process shifts to Step S202, and whether a set function is enabled is determined.

When the set function is enabled (YES), the process shifts to Step S203, and the set function is executed. In a case where this function has already been being executed, execution of this function is continued. Then, the surveying instrument TSx completes the process.

When the set function is disabled (NO), the process shifts to Step S204 and the surveying instrument TSx stops this function, and checks whether there is a message to be displayed in the management server MS, and when there is a message, the surveying instruments TS downloads and acquires from the management server MS and displays the message on the display unit 24. The surveying instrument TSx completes the process.

Modification 1

Next, an example in which, as a function related to a surveying instrument TSx, a function to be executed in the surveying instrument TSx is added by being installed in the surveying instrument TSx is illustrated.

(Workflow of Remote Operation System)

Figure 8:
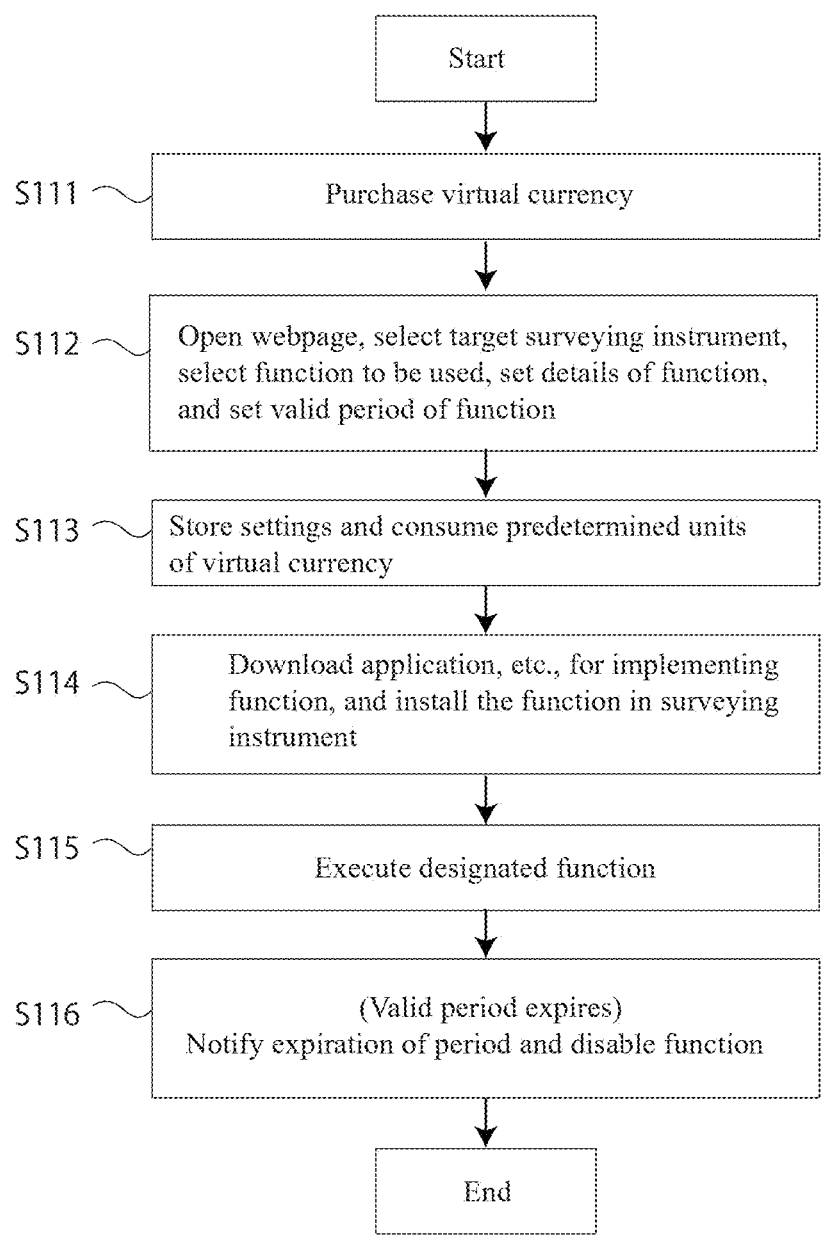
FIG. 8 is a flowchart illustrating a workflow of a remote operation system according to Modification 1.

FIG. 8 is a flowchart illustrating a workflow of a remote operation system 10 according to Modification 1. In the following description of Modifications, regarding substantially the same step as in Example, this sameness is described as necessary, and overlapping description is omitted.

In Step S111, as in Step S101, a user logs in to the webpage 100 from the remote terminal RC and purchases virtual currency.

Next, in Step S112, as in Step S102, the user logs in to the webpage 100 from the remote terminal RC, selects a target surveying instrument TSx, selects a function to be added with respect to the surveying instrument TSx, sets details of this function, and sets a valid period of this function.

Examples of the function to be added include, for example, in addition to the functions (1) to (4) illustrated in Example 1, (5) Function of updating and version upgrading of an application, etc., of a function implemented in the surveying instrument TS.

Regarding the functions (1) to (4), unlike Example 1, an application, etc., necessary for implementing a function is not built in at the time of shipment.

On the setting completion permission screen, it is displayed that predetermined units of virtual currency need to be consumed to complete setting. By selecting "YES," the process shifts to Step S113, and as in Step S103, the settings are stored in the management server MS, and the predetermined units of virtual currency purchased in advance are consumed in Step S111.

Next, when the process shifts to Step S114, the surveying instrument TSx automatically downloads an application, etc., for implementing the designated function from the management server MS, and installs it in the surveying instrument TSx.

Next, the process shifts to Step S115, and the surveying instrument TSx executes the designated function.

Then, when the valid period expiration date and time arrives and the valid period expires, the process shifts to Step S116, and the management server MS disables the above-described function and notifies the user of the expiration of the valid period.

(Operation of Surveying Instrument)

Figure 9:
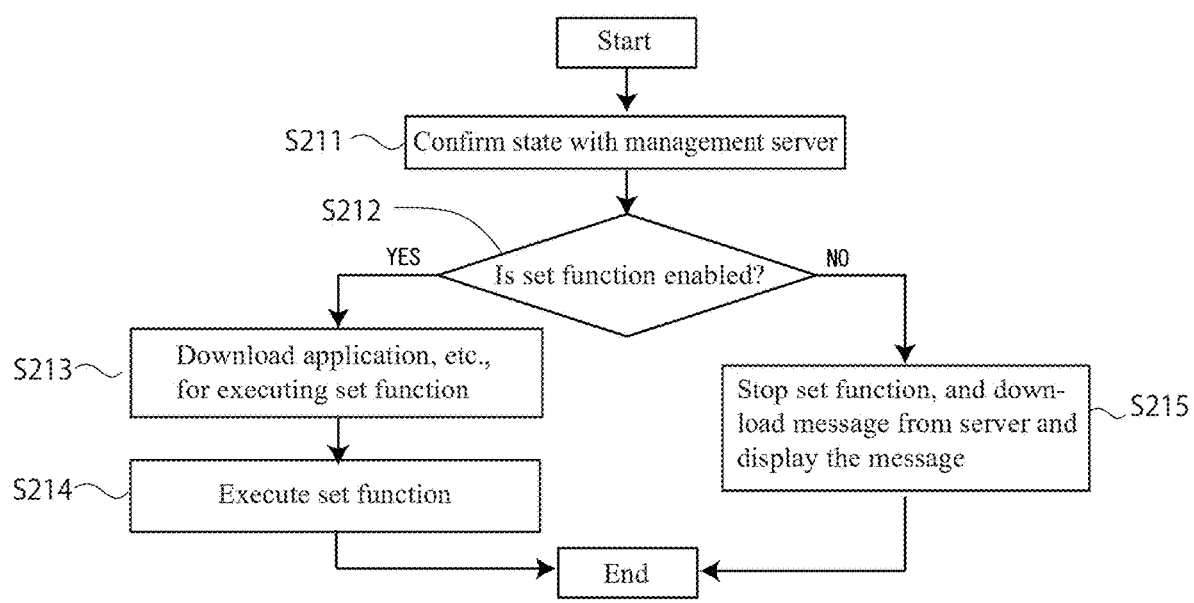
FIG. 9 is a flowchart of operation of a surveying instrument according to the same Modification.

FIG. 9 is a flowchart of operation of the surveying instrument TSx according to the present Modification. The surveying instrument TSx communicates with the management server MS at a constant cycle, and executes the following operation. Other operations are substantially the same as in Example 1, so that description of these is omitted.

First, in Step S211, the surveying instrument TSx checks a state of the management server MS. Then, the process shifts to Step S212, and determines whether a set function is enabled.

When the set function is enabled (YES), the process shifts to Step S213, and an application, etc., for implementing the set function is downloaded from the management server MS.

Then, the process shifts to Step S214, and the surveying instrument TSx executes this function. However, in Step S213, in a case where this function has already been executed, downloading is not performed, and execution of this function is continued. Then, the surveying instrument TSx completes the process.

On the other hand, in Step S212, when the set function is disabled (NO), the process shifts to Step S215 and this function is stopped, and whether there is a message to be displayed in the management server MS is checked, and when there is a message, the message is downloaded and acquired from the management server MS and displayed on the display unit 24. Then, the surveying instrument TSx completes the process.

Modification 2

Next, an example in which, as a function related to the surveying instrument TSx, a function to be executed on a webpage displayed on the remote terminal RC is added, is illustrated.

(Workflow of Remote Operation System 10)

Figure 10:
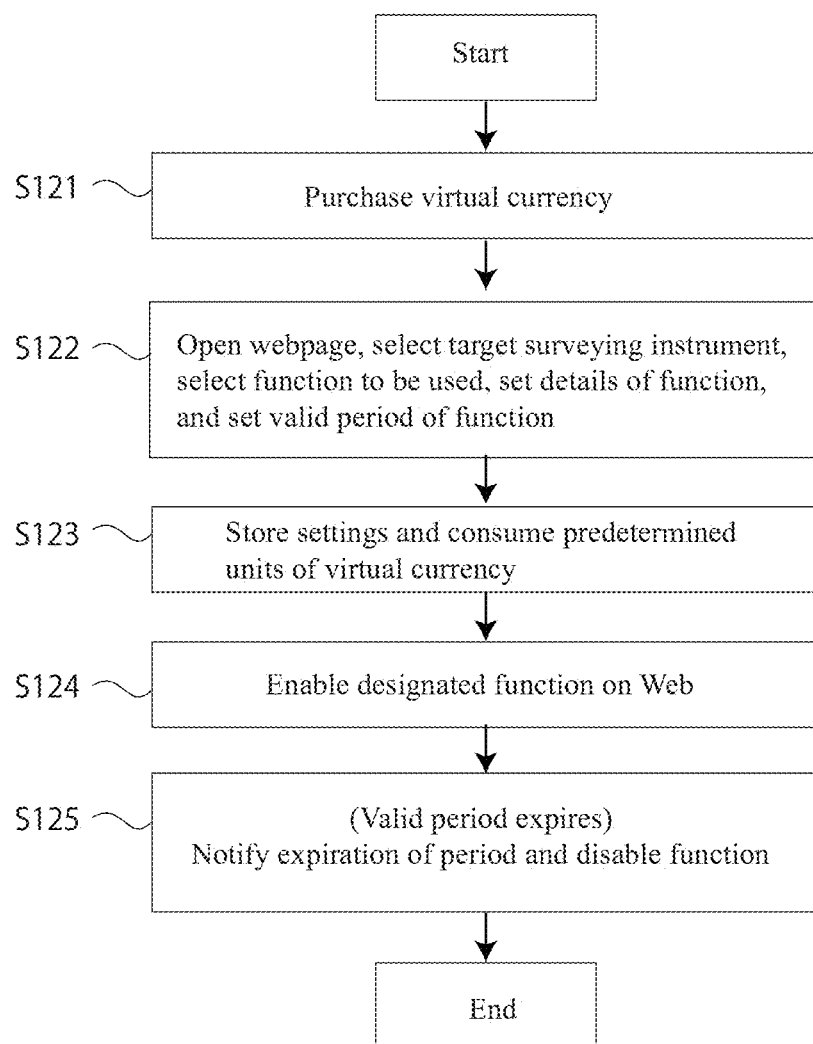
FIG. 10 is a flowchart illustrating a workflow of a remote operation system according to Modification 2.

FIG. 10 is a flowchart illustrating a workflow of a remote operation system 10 according to Modification 2.

In Step S121, as in Step S101, a user logs in to the webpage 100 from the remote terminal RC, and purchases virtual currency.

Next, in Step S122, as in Step S102, the user logs in to the webpage 100 from the remote terminal RC, selects a target surveying instrument TSx, selects a function to be added with respect to the surveying instrument TSx, sets details of this function, and sets a valid period of this function.

The function to be added is selected from, for example, a list of functions related to the surveying instrument TSx, displayed on the webpage 100. A function in the present example is a function to be executed on the webpage 100.

Examples of the function related to the surveying instrument TSx are as follows.

(6) Function of displaying information transmitted as needed from the surveying instrument TS to the management server MS as a report on the webpage 100.

Detailed Examples:

Operating time report

Report on maintenance records of the instrument

Report on information about a position at which the instrument operated, etc.

(7) Function of analyzing data transmitted as needed from the surveying instrument TS to the management server MS, and displaying the analysis results on the webpage 100.

Detailed Examples:

Use time prediction model based on operating time records

Maintenance time prediction model based on operating time records

Future trouble prediction and responding method based on error information (8) Function of releasing (enabling) a function that has already been implemented in the surveying instrument TS but is restricted, from the webpage 100.

Detailed Examples:

Removing restrictions on position range in which the surveying instrument is operable, from the webpage 100

Enabling a function of remotely locking the surveying instrument from the webpage 100

On the setting completion permission screen, it is displayed that predetermined units of virtual currency need to be consumed to complete setting. By selecting "YES," the process shifts to Step S123, and as in Step S103, the settings are stored in the management server MS, and the predetermined units of virtual currency purchased in advance are consumed in Step S121.

Next, the process shifts to Step S124, and the management server MS enables execution of the designated function on the webpage 100, and executes the function according to a command on the webpage 100.

Then, when the valid period expires, the process shifts to Step S125, and the management server MS disables the above-described function on the webpage 100, and notifies the user of expiration of the valid period.

Modification 3

Figure 11:
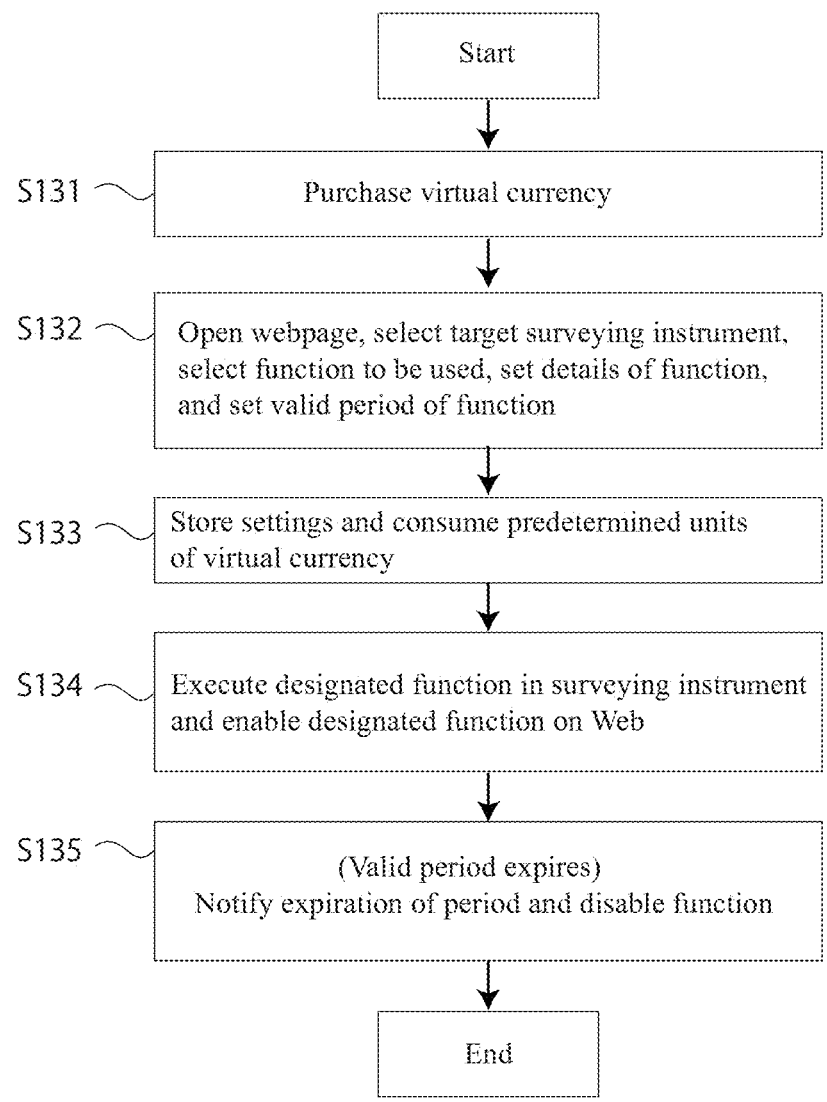
FIG. 11 is a flowchart illustrating a workflow of a remote operation system according to Modification 3.

Next, an example in which, as a function related to the surveying instrument TSx, a function to be executed in the surveying instrument TSx and a function to be executed on a webpage displayed on the remote terminal are combined and added, is illustrated. FIG. 11 is a flowchart illustrating a workflow of a remote operation system 10 according to Modification 3.

In Step S131, as in Step S101, a user logs in to the webpage from the remote terminal RC, and purchases virtual currency.

Next, in Step S132, as in Step S102, the user logs in to the webpage from the remote terminal RC, selects a target surveying instrument TSx, selects a function to be added with respect to the surveying instrument TSx, sets details of this function, and sets a valid period of this function.

The function to be added is selected from, for example, a list of functions related to the surveying instrument TSx, displayed on the webpage 100. A function in the present modification is a function to be executed on the webpage and in the surveying instrument TS.

Examples of the function related to the surveying instrument TSx are as follows.

(9) Function of checking a detailed machine log of the surveying instrument TS.

Examples of the machine log are the motor rotation time/the number of EDM shutter operations, machine key operation records, detailed information of the tilt sensor, etc. These detailed data are not transmitted to the management server MS in normal conditions, and need to be transmitted to the management server MS separately from normal operation.

(10) Function of analyzing data acquired in (9), and displaying the results on the webpage 100.

For example, display of a maintenance time prediction model based on a motor rotation time, and display of a maintenance time, etc., are executed.

(11) Function of setting whether a cloud storage to enable a storage area of the management server MS to be used by the surveying instrument TS as its own storage is usable, and setting a usable size.

(12) Function of automatically transmitting an e-mail from the surveying instrument TS when an error occurs.

(13) Function of remotely operating the surveying instrument from the webpage 100 by remote access.

(14) Function of transmitting an arbitrary message to the surveying instrument TS from the webpage 100.

(15) Function of transmitting an arbitrary message to the management server MS from the surveying instrument TS, and displaying the message on the webpage 100.

When the settings are permitted, the process shifts to Step S133, and as in Step S103, the management server MS stores the settings, and in Step S131, predetermined units of virtual currency purchased in advance are consumed.

Next, the process shifts to Step S134, and the management server MS enables execution of the designated function on the webpage and in the surveying instrument TSx.

Then, when the valid period expires, the process shifts to Step S135, and the management server MS disables the above-described function on the webpage 100, and notifies the user of expiration of the valid period.

Modification 4

As another modification, as a function related to the surveying instrument TSx, a function executable in the management server MS can be added in addition to a function to be executed on the Web and in the surveying instrument TS, or singly. For example, a function of transmitting an arbitrary message by e-mail at a designated date and time, etc., can be added.

Modification 5

As still another modification, in addition to setting of a valid period, it is also possible that the number of executions of a function is restricted to, for example, 1, 10, etc., and the function is disabled when the upper limit of the number of executions is exceeded. For example, it is also possible that a valid period is not set, and setting is made so that one unit of virtual currency is consumed each time the function is used once. For the functions of (14) and (15) described above, for example, settings can be made so that a message can be transmitted five times per consumption of one unit of virtual currency.

In this case, in FIG. 7, instead of reading out a valid period expiration date and time of the set function by the setting readout unit 45 of the management server MS (Step S201) and determining whether the valid period has expired by the determination execution unit 46 (Step 202), the setting readout unit 45 reads out the stored number of executions of the function, the determination execution unit 46 compares this number with the set possible number of executions, and disables the function when a difference between the number of executions and the set possible number of executions becomes zero.

Modification 6

As still another modification, it is also possible that settings are made so that the above-described functions and settings are arbitrarily combined and executed as one function.

As an example of this function, a maintenance management function is described. Setting is made so that one unit of virtual currency is consumed for the maintenance management function in which, as maintenance settings, an administrator (user in the present description) such as a management company sets a date and time when a predetermined maintenance operation is necessary in periodic maintenance, etc., as a maintenance date, a prior notification is given before the maintenance date arrives, and when the maintenance date arrives, a main notification to notify the arrival of the maintenance date is given, and the main notification is stopped when the administrator cancels the maintenance settings. The prior notification and main notification are given by display on the surveying instrument TS, display on the webpage 100, and transmission of an e-mail.

In this way, in the remote operation system 10 according to the present modification, the maintenance management function as a combination of a function of the surveying instrument TS, a function on the Web, and a function in the management server MS, can be added.

In this maintenance management function, the notification is not stopped until the administrator cancels the maintenance settings, so that a user can be urged to request the administrator for a maintenance operation.

In this way, with the remote operation system 10 according to the present embodiment, various functions as illustrated above can be added according to the needs of a user. A price for the added function can be paid in virtual currency, so that the user can use a function that fulfills an individual use purpose at a corresponding price. The manufacturer can earn revenue corresponding to the quantity of added functions, so that the manufacturer can provide the surveying instrument main body at a reasonable price.

Further, new functions to be developed in the future can also be added.

With the remote operation system 10 according to the present embodiment, a simple and safe payment method using virtual currency is used, so that a user does not have to perform troublesome procedures for payment, and therefore user convenience is improved.

In addition, with the remote operation system 10 according to the present embodiment, various services can be provided not only to a so-called user of a surveying instrument but also to an administrator such as a management company or agent.

Although preferred embodiments of the present invention and modifications of the embodiments are described above, these are just examples of the present invention, and these can be combined based on knowledge of those skilled in the art, and such combined embodiments are also included in the scope of the present invention.

REFERENCE SIGNS LIST

10 Remote operation system of surveying instrument
21 Survey unit
22 Control unit
23 Communication unit
N Communication network
MS Management server
RC Remote terminal
TS Surveying instrument
AS Billing system

The invention claimed is:

1. A system comprising:
a plurality of surveying instruments of a user wherein each of the plurality of surveying instruments has one or more built-in functions;
a server;
a terminal;
wherein the plurality of surveying instruments, the server and the terminal are connected to, and communicate over, a communication network, and wherein the server:
receives a purchase request from the user, via the terminal, for virtual currency,
generates and stores the virtual currency, associates the generated virtual currency with the user in a database,
displays, via the terminal, the plurality of surveying instruments and associated one or more built-in functions,
receives, via the terminal, and stores a selection from the user of: at least one of the displayed one or more of the plurality of survey instruments, the one or more built-in functions of the one or more selected surveying instruments and valid period for each of the selected functions,
consumes an amount from the stored virtual currency based on the selections, and enables the selected functions on the selected surveying instruments;
wherein a surveying instrument of the selected surveying instruments, via the server, determines that a built-in function of the selected functions is enabled, downloads an application for the determined built-in function, and executes the built-in function using the application, and
wherein the server disables the built-in function of the surveying instrument and displays a message on the surveying instrument upon determining that the valid period for the built-in function has expired.

2. The system according to claim 1, wherein the server sets an upper limit of a numerical quantity of executions of a selected built-in function related to one of the surveying instruments.

3. The system according to claim 1, wherein the server receives a unit quantity of the virtual currency consumed for a unit valid period of the selected built-in function related to the surveying instrument, and consumes virtual currency of a multiple of the unit quantity corresponding to a valid period set to a multiple of the unit valid period.

4. The system according to claim 1, wherein the selected built-in function related to the surveying instrument is a maintenance management function of managing a maintenance state of the selected surveying instrument.

5. The system according to claim 4, wherein the server receives a date and time associated with a predetermined maintenance operation.

\* \* \* \* \*